United States Patent [19]

Fannin et al.

[11] Patent Number: 4,574,450

[45] Date of Patent: Mar. 11, 1986

[54] METHOD OF SERVICING A VEHICLE SUSPENSION UNIT WITH REPLACEMENT AIR SPRING

[75] Inventors: Wayne V. Fannin, Xenia; James M. Pees, Dayton, both of Ohio

[73] Assignee: General Motors Corporation, Detroit, Mich.

[21] Appl. No.: 722,705

[22] Filed: Apr. 12, 1985

Related U.S. Application Data

[60] Division of Ser. No. 597,967, Apr. 9, 1984, Pat. No. 4,534,545, which is a continuation of Ser. No. 324,490, Nov. 21, 1981, abandoned.

[51] Int. Cl.⁴ .............................. B23P 7/00; F16F 9/04; F16J 15/50
[52] U.S. Cl. .............................. 29/402.08; 267/64.21; 267/64.24; 29/453; 29/402.02; 280/712; 74/18.2; 188/298

[58] Field of Search ............... 29/402.08, 453, 402.02, 29/402.01, 402.03, 402.09, 402.11, 402.12, 402.14; 267/64.24, 64.27, 64.19, 64.21, 64.23, 34, 151, 122; 74/18.2; 188/298; 280/712

[56] References Cited

U.S. PATENT DOCUMENTS

| | | | |
|---|---|---|---|
| 3,178,167 | 4/1965 | Loewis | 267/64.21 |
| 3,372,919 | 3/1968 | Jackson | 267/64.21 |
| 3,954,255 | 5/1976 | Keijzer | 267/64.21 |
| 3,954,257 | 5/1976 | Keijzer | 267/64.21 |
| 4,241,839 | 12/1980 | Alberghini | 29/453 |

Primary Examiner—Howard N. Goldberg
Assistant Examiner—Vernon K. Rising
Attorney, Agent, or Firm—Charles R. White

[57] ABSTRACT

A suspension unit operatively connected between sprung and unsprung portions of a vehicle includes a replacement air sleeve and special air sleeve fitting facilitating installation. The air sleeve fitting is installed over the reservoir tube of the suspension unit and cooperates with a dust tube to locate the air sleeve on the suspension unit.

2 Claims, 3 Drawing Figures

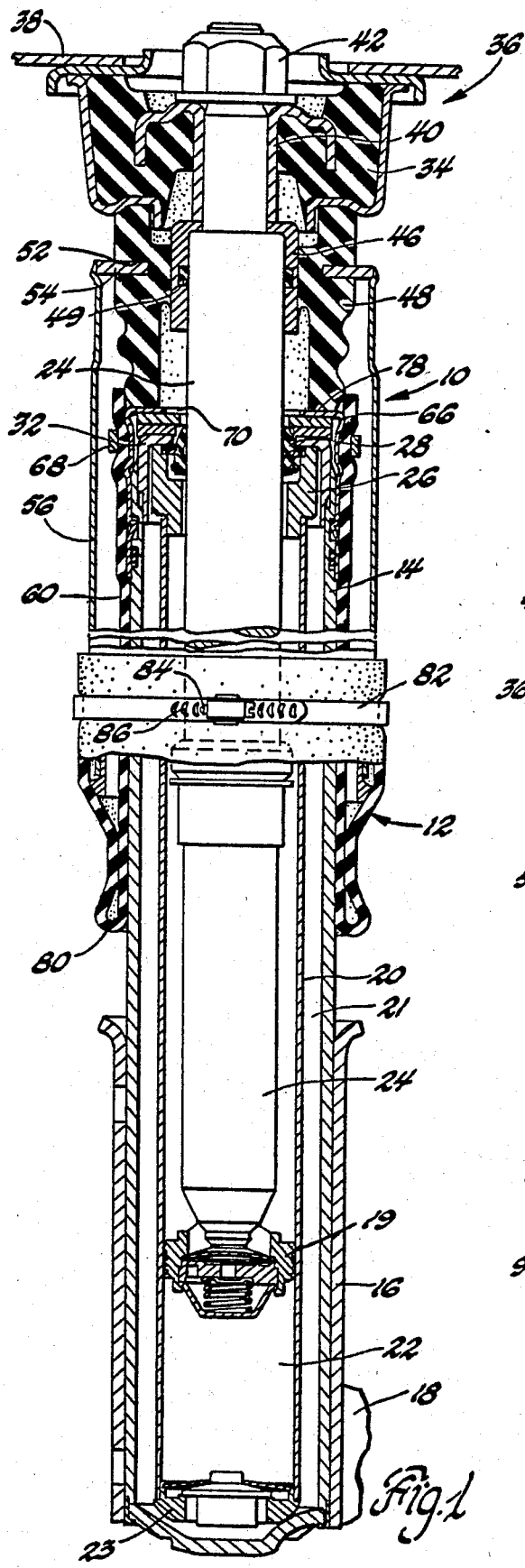
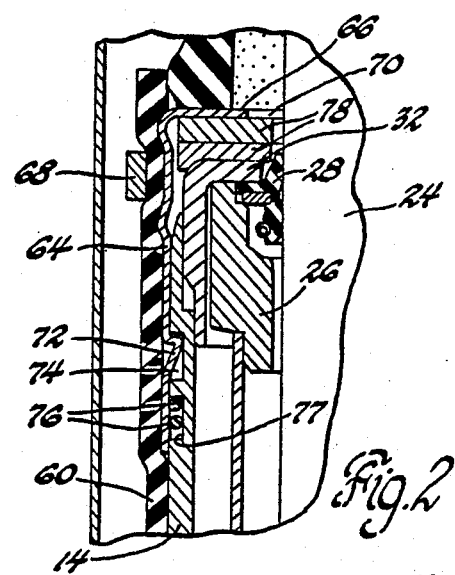
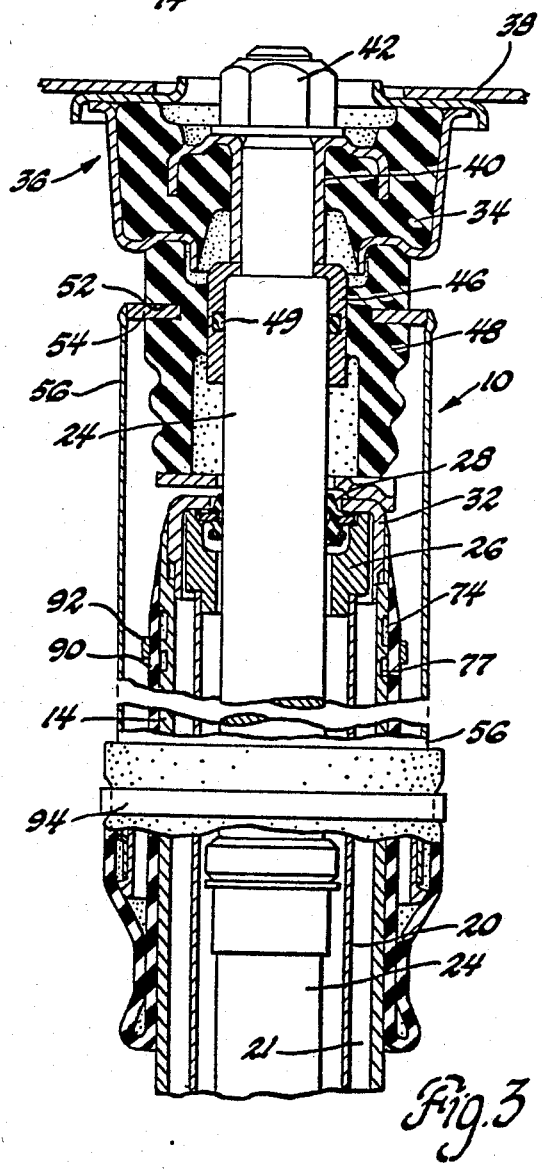
Fig.1
Fig.2
Fig.3

METHOD OF SERVICING A VEHICLE SUSPENSION UNIT WITH REPLACEMENT AIR SPRING

This is a division of application Ser. No. 597,967 filed on Apr. 9, 1984, and now U.S. Pat. No. 453,545, which is a continuation of Ser. No. 324,490, filed Nov. 21, 1981 and now abandoned.

This invention relates to a vehicle suspension unit having an air spring provided by an elastomeric sleeve and mount assembly pneumatically secured to the unit to replace a worn elastomeric sleeve.

Prior air spring strut and load leveling shock absorber units have provided highly desirable vehicle suspension and leveling characteristics with good service life. Such constructions while providing exceptional ride and leveling control often require replacement of the air spring after extended service use or after accidental damage. Prior to the present invention, the rebuild of the air spring for leveling type shock absorbers and for suspension strut units was relatively difficult and time consuming.

In contrast with the prior constructions, this invention provides for new and improved serviceable air struts and load leveling shock absorbers which feature an advanced and improved connection and sealing of the air sleeve to such units with a simple slip fit of an upper fitting to the reservoir tube. This upper fitting, to which the upper end of the air sleeve has been previously clamped, makes a positive and highly effective air seal to enhance the replacement of used sleeves. With this invention, the upper and lower sealing of the replacement air spring is improved to an extent where repair can be readily accomplished by a wide range of users including those with only average mechanical skills. After installation of the upper fitting and the replacement air sleeve, the lower end thereof can be readily attached to the dust tube or other construction by a simple and conventional hose clamp.

Accordingly, it is a feature, object and advantage of this invention to provide a new and improved serviceable vehicle suspension unit in which a replacement elastomeric air sleeve is connected at one end to a special fitting which slip fits with pneumatic sealing onto one end of a tubular component of the suspension unit and which permits the ready attachment of the other end of the air sleeve to the unit by simple hose clamp construction to establish an air suspension spring.

These and other objects, features and advantages of this invention will become more apparent from the following detailed description and drawing in which:

FIG. 1 is a cross-sectional view of an air adjustable suspension strut with replacement air sleeve according to this invention;

FIG. 2 is an enlargement of a portion of the suspension strut of FIG. 1; and

FIG. 3 is a cross-sectional view of a factorybuild air adjustable suspension strut prior to being serviced with the new air sleeve construction of this invention.

Turning now in greater detail to the drawing, there is shown in FIGS. 1 and 2 an air adjustable vehicle suspension strut 10 with a rebuilt air spring 12 operatively disposed between the sprung and unsprung components of the vehicle. The strut 10 has an outer reservoir tube 14 mounted in a cup-like retainer 16 that is connected to an axle, wheel assembly or other unsprung portion 18 of the vehicle. The suspension strut incorporates a valved piston 19 mounted for sliding reciprocal movement in an oil-filled cylinder tube 20. The space between the cylinder tube and reservoir tube forms a reservoir 21 for the hydraulic fluid of the strut which is connected to the compression chamber 22 in the cylinder tube by a base valve 23. A cylindrical piston rod 24 extends upwardly from welded attachment with the piston 19 and slidably through a generally cylindrical piston rod guide 26 press fitted in the upper end of the cylinder tube 20. An annular elastomeric seal 28, seated in a counterbore or recess in the upper end of the rod guide 26, surrounds and sealingly engages the piston rod 24. The seal 28 is held in the recess in the rod guide 26 by a cylindrical end cap 32 press fitted into the upper end of the reservoir tube 14. The rod guide 26 and seal construction blocks the passage of oil from the interior of the cylinder and reservoir tubes and prevents entry of foreign matter from the exterior into these tubes.

The piston rod 24 extends through end cap 32 into connection with an elastomeric isolator 34 of an upper mount assembly 36 which is in turn secured to the sprung portion 38 of the vehicle. In this preferred embodiment, the piston rod 24 projects through a tubular connector 40 embedded in the isolator 34, and a nut 42 threaded onto the end of the piston rod traps the isolator thereon as shown in FIG. 1. A sleeve-like carrier member 46 is securely mounted on the piston rod 24 near the upper end thereof for supporting a generally cylindrical elastomeric cushion spring 48. An annular O-ring 49 is disposed between the piston rod and the inner wall of the carrier member 46 to provide sealing in this area. The cushion spring 48 is disposed immediately below the upper mount assembly 36 and, being made of a suitable elastomer material, deflects when the strut components telescope together to cushion compression loads experienced by the strut. The cushion spring is grooved at 52 to provide a recess to receive the disc-like end plate 54 of a dust tube 56 having a cylindrical wall which extends downwardly from connection with plate 54 to cover a portion of the reservoir tube as well as cushion spring 48 and other components of the strut.

The air spring 12 of the strut comprises a tubular sleeve 60 of a suitable elastomeric material having its upper end secured by annular hose clamp 68 to the cylindrical wall 64 of an upper fitting 66. The fitting 66 is preferably a metallic cup-like member which has a centralized opening 70 in its upper end wall to accommodate piston rod 24 extending therethrough. The cylindrical wall 64 of the upper fitting closely fits over the wall of the reservoir tube 14 and is formed with inwardly extending depressions, dimples or an annulus which provides a spring retainer 72. This spring retainer provision is received in an annular retainer groove 74 formed in the reservoir tube 14. With this connection, the upper fitting is secured to the reservoir tube 14. Disposed below the mechanical attachment provided by the spring retainer 72 and retainer groove 74 are a pair of O-rings 76 disposed in an annular groove 77 formed in the reservoir tube which sealingly engage the inner wall of the upper fitting 66. Washer-like spacers 78 are installed on end cap 32 prior to installation of the fitting 66.

The hose clamp 68 is factory constricted such as by magniforming or by other suitable methods to sealingly connect the upper end of the sleeve to the upper end of the fitting. The sleeve 16 and upper fitting 66 and the O-ring seal 76 are supplied as a repair or replacement kit for the original equipment shown in FIG. 3.

From the magniformed hose clamp 68, the sleeve 60 extends downwardly around the reservoir tube 14 and is reversely curved to form an annular rolling lobe 80. From lobe 80 the sleeve extends upwardly around the lower extremity of the dust tube 56 where it is secured by a clamping band 82. This clamping band 82 has a worm screw 84 affixed to one end thereof that engages the series of slots 86 formed in the other end. The band 82 is tightened or loosened as desired by appropriate turning of the worm screw 84 by conventional screwdriver or other tooling. With the band 82 sufficiently tightened around the lower end of the sleeve 60, a pneumatic seal is accomplished to complete the air spring 12. Suitable fittings not illustrated can be provided in the wall of the dust tube for connection with a level control system such as that shown in U.S. Pat. No. 4,168,840 issued Sept. 25, 1979 to Donald E. Graham for motor vehicle level control circuit hereby incorporated by reference.

FIG. 3 shows the strut as originally manufactured with elastomeric tubular sleeve 90 fastened at its upper end directly to the reservoir tube by hose clamp 92 magniformed or otherwise constricted to provide a pneumatic seal between the sleeve and the reservoir tube. The annular grooves 74 and 77 are formed in the reservoir tube to accommodate the spring tangs 72 and the O-ring seals of the rebuilt kit as explained in connection with FIGS. 1 and 2. The lower end of the sleeve is secured to a lower end of the cylindrical wall 56 of the dust tube by a hose clamp 94 magniformed or otherwise shrunk to provide the pneumatic seal required to establish the original air suspension spring.

Assuming that the original air spring of FIG. 3 requires replacement, the hose clamp 94 can be severed and removed. After uncoupling the upper mount from the sprung portion of the vehicle, the nut 42 and the upper mount assembly are removed. After such removal, the cushion spring 48, the dust tube 56, the worn sleeve 90 and the upper clamp 92 are removed from the strut. Since the cushion spring 48 and the dust tube 56 attached thereto are to be reused, the worn sleeve 90 and this clamping ring 94 are freed from the dust tube 48 and discarded. After such removal, the washer-like spacers 78 are stacked on the end cap 32 and the O-ring seals are installed in groove 77. The new air sleeve 60 is axially advanced over the reservoir tube until the upper fitting 66 slips into position on the reservoir tube with the spring tangs or other inwardly extending detents 72 snapping into the groove 74. Hose clamp 68 being previously factory installed cooperates with the O-ring seal 76 to complete the sealing of the upper end of the air spring. The free end of the sleeve 60 is then reversely curved and the lower end thereof is stretched around the lower end of the dust tube to receive the clamping band 82 which can be readily installed by the ordinary mechanic. With the air strut rebuilt, it can be reinstalled on the vehicle and reattached to the leveling system for leveling or spring suspension operation.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A method of servicing an air spring suspension strut having a hydraulic shock absorber with outer fluid reservoir tube and having a worn cylindrical air sleeve of rubber-like material with one end contacting and directly connected by first encircling clamp means to said reservoir tube and the other end contacting and directly connected to a dust tube of the strut by second encircling clamp means, the dust tube being removably connected to an upper end of a reciprocally movable piston rod of the shock absorber and cooperating with the air sleeve to form a chamber to receive pressurized air and provide a pneumatic spring between sprung and unsprung vehicle components comprising the steps of removing the dust tube from the piston rod and the worn air sleeve from direct engagement with said reservoir tube of the strut, axially moving a replacement air sleeve and an upper thin walled sheet metal cylindrical fitting secured in an air-tight manner thereto as a unit over the reservoir tube until the fitting positively locks axially to said reservoir tube and in an air-tight manner directly onto the reservoir tube, reinstalling the dust tube to the strut, extending the lower end of the replacement air sleeve around the lower end of the dust tube, clamping the lower end of the air sleeve to the outer lower end of said dust tube in an air-tight manner to complete the air sleeve replacement so that the replacement air sleeve has contiguous and direct contact with said reservoir tube and so that the interior of the air sleeve can be subsequently charged with pressurized air.

2. A method of servicing an air spring suspension strut having a hydraulic shock absorber with a cylinder tube mounted within a reservoir tube and having a worn cylindrical rolling lobe air sleeve of elastomer material, said air sleeve having one end contacting and connected by first encircling clamp means directly to said reservoir tube and the other end contacting and directly connected to a cylindrical dust tube of the strut by second encircling clamp means, the dust tube being disposed radially outward of said reservoir tube and removably secured to the upper end of a reciprocally movable piston rod of the shock absorber and cooperating with the air sleeve to form a chamber to receive pressurized air and provide a pneumatic spring between sprung and unsprung vehicle components comprising the steps of removing the dust tube from the piston rod, respectively disconnecting the first and second encircling clamp means from the reservoir and dust tubes, removing the worn air sleeve from direct engagement with the reservoir tube of the strut, axially installing a replacement elastomeric air sleeve and upper cylindrical sheet metal fitting in a substantially linear path over the reservoir tube until the fitting positively locks in a predetermined axial position and in an air-tight manner directly on the reservoir tube, reinstalling the dust tube on the piston rod, extending the lower end of the replacement air sleeve around the lower end of the dust tube, clamping the lower end of the air sleeve to the lower outer end of said dust tube in an air-tight manner to finish the air sleeve replacement so that said air sleeve has direct rolling contact with the reservoir tube when the interior of the air sleeve is charged with pressurized air and operates as an air spring.

* * * * *